(12) United States Patent
Parsons

(10) Patent No.: US 7,216,487 B2
(45) Date of Patent: May 15, 2007

(54) METERING DEMAND FUEL SYSTEM FOR GAS TURBINE ENGINES

(75) Inventor: Douglas A. Parsons, Canton, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 253 days.

(21) Appl. No.: 10/942,206

(22) Filed: Sep. 16, 2004

(65) Prior Publication Data

US 2006/0053803 A1    Mar. 16, 2006

(51) Int. Cl.
*F02C 9/28* (2006.01)
(52) U.S. Cl. .................. 60/773; 60/39.281; 60/734
(58) Field of Classification Search ............ 60/39.281, 60/734, 772, 773, 776
See application file for complete search history.

(56) References Cited

U.S. PATENT DOCUMENTS

| | | | |
|---|---|---|---|
| 3,908,360 A * | 9/1975 | Meyer et al. ............ | 60/39.281 |
| 3,946,551 A * | 3/1976 | Linebrink et al. ....... | 60/39.281 |
| 4,208,871 A * | 6/1980 | Riple ...................... | 60/39.281 |
| 4,332,527 A | 6/1982 | Moldovan et al. | |
| 4,607,486 A | 8/1986 | Cole et al. | |
| 5,116,362 A | 5/1992 | Arline et al. | |
| 5,220,793 A | 6/1993 | McGlone et al. | |
| 6,353,790 B1 * | 3/2002 | Tsuzuki ................... | 701/100 |
| 2001/0054290 A1 * | 12/2001 | Herbison et al. ........ | 60/734 |

FOREIGN PATENT DOCUMENTS

GB    652 321    4/1951

OTHER PUBLICATIONS

European Communication and Search Report, Feb. 15, 2006.

* cited by examiner

*Primary Examiner*—L. J. Casaregola
(74) *Attorney, Agent, or Firm*—Carlson, Gaskey & Olds

(57) ABSTRACT

A fuel system includes a turbine engine, and an electric motor that are independently drivable relative to one another. The electric motor has a speed that is selectively controlled based upon a desired fuel flow. A centrifugal pump is driven by the turbine engine. The centrifugal pump provides a desired fuel pressure for the fuel system. A positive displacement pump is driven by the electric motor The positive displacement pump is in fluid communication with the centrifugal pump, for example in a series arrangement. The positive displacement pump meters a desired volume in response to the speed of the second drive assembly.

12 Claims, 2 Drawing Sheets

METERING DEMAND FUEL SYSTEM FOR GAS TURBINE ENGINES

BACKGROUND OF THE INVENTION

This invention relates to a fuel system for delivering fuel to gas turbine engines.

Prior art fuel systems include a large positive displacement pump driven by a turbine engine through a gearbox. To achieve the desired fuel volumes and pressures for the demands of the turbine engine, the positive displacement pump is specifically oversized for peak demand. As a result, the fuel system utilizes a bypass valve to return the unneeded fuel back to tank, which is greatly inefficient. Moreover, the returned fuel is hot, which undesirably raises the temperature of the fuel within the fuel tank. Excess pressure that is generated must be relieved using a pressure regulator to mitigate any potential burst or over pressure conditions.

Prior art fuel systems employ precision metering valves to regulate the flow rate through the fuel system to meet the turbine engine fuel demand. The metering valves have tight tolerances and any contamination present within the fuel system comprises the operation of the valves.

Utilizing an electric motor instead of the turbine engine to drive the positive displacement pump to meet a turbine engine fuel demand is not practical. In one example, an 80 horse power motor weighing over 100 pounds would be necessary to supply the needed fuel to the turbine engine, which is not acceptable within the industry.

What is needed is a fuel system that eliminates the need for expensive, high accuracy fuel metering valves and reduces excess pressure and flow within the fuel system.

SUMMARY OF THE INVENTION

The present invention provides a fuel system including first and second drive assemblies that are independently drivable relative to one another. In one example, the first drive assembly is a turbine engine, and the second drive assembly is an electric motor. The second drive assembly has a speed that is selectively controlled based upon a desired fuel flow.

A non-positive displacement pump, such as a centrifugal pump, is driven by the first drive assembly. The centrifugal pump provides a desired fuel pressure for the fuel system. A positive displacement pump is driven by the second drive assembly. The positive displacement pump is in fluid communication with the centrifugal pump, for example in a series arrangement. The positive displacement pump meters a desired volume in response to the speed of the second drive assembly.

The positive displacement pump may be arranged before or after the centrifugal pump, and more than one centrifugal pump may be used.

In operation, a desired fuel flow is requested based upon the fuel flow demanded by the turbine engine. A controller commands the first drive assembly to rotate the positive displacement pump at a speed providing a fuel volume that sufficiently satisfies that desired fuel flow. The centrifugal pump is driven by the turbine engine independently of the positive displacement pump. The centrifugal pump produces a desired fuel pressure for the fuel volume.

Accordingly, the present invention provides a fuel system that eliminates the need for expensive, high accuracy fuel metering valves and reduces access pressure and flow within the fuel system.

These and other features of the present invention can be best understood from the following specification and drawings, the following of which is a brief description.

DETAILED DESCRIPTION OF THE PREFERRED EMBODIMENT

Figure 1:
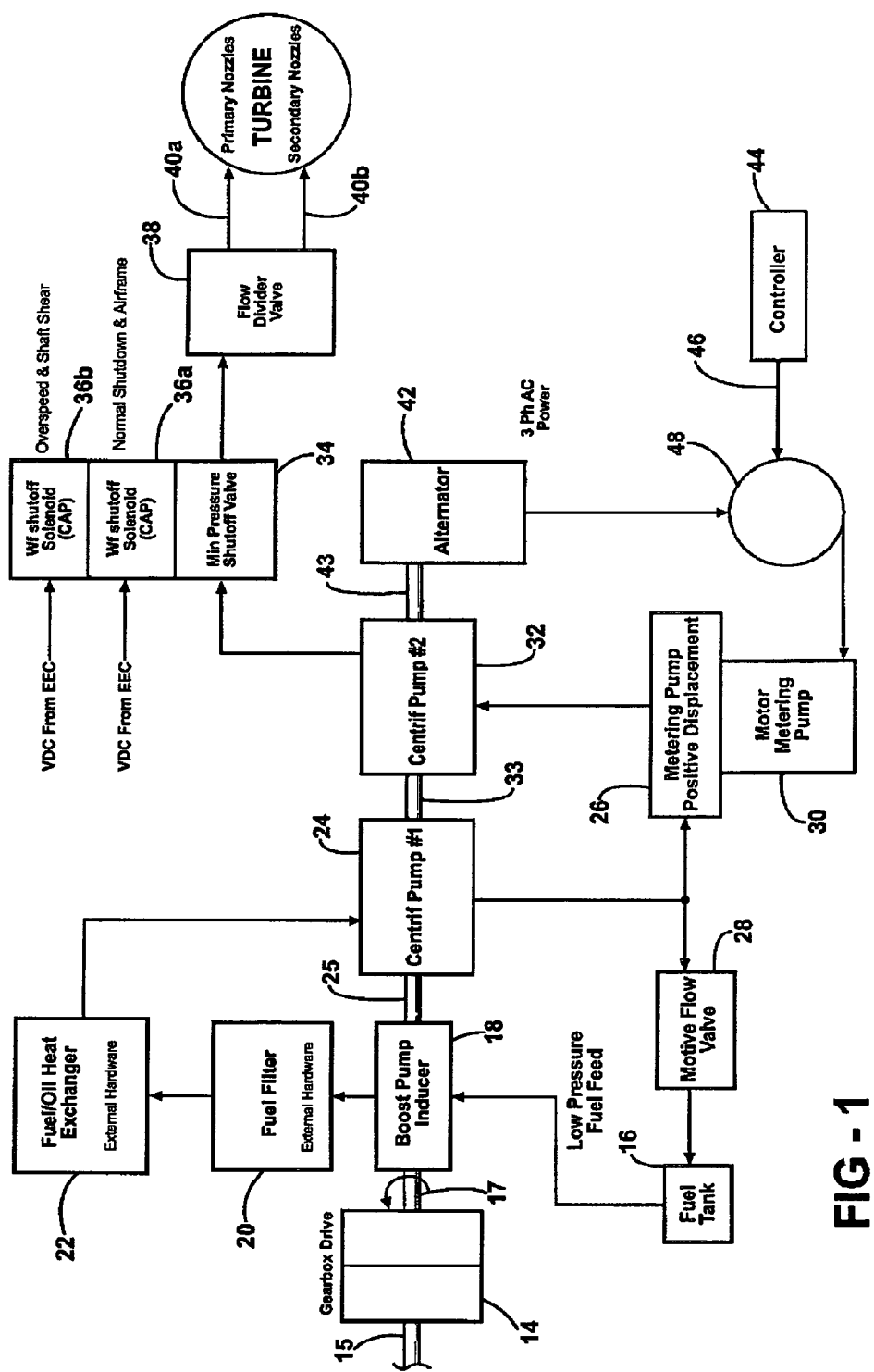
FIG. 1 is a schematic view of an example the inventive fuel system having centrifugal and positive displacement pumps.

A schematic of one example of an inventive fuel system 10 is shown in FIG. 1. The fuel system 10 includes a turbine engine 12 that receives fuel from a fuel tank 16. A gearbox 14 is used to drive various components of the fuel system 10 and may be mounted on the turbine engine 12 such that gearbox 14 receives rotational input from the turbine engine 12.

The fuel system 10 only illustrates portions of an example fuel system for clarity. The components depicted should in no way be interpreted as limiting the inventive pump arrangement. The example fuel system 10 shown may be suitable for small engine applications such as those used for business jets. Large engine and other small engine applications may have different or additional components.

The gearbox 14 drives a boost pump inducer 18 through a shaft 17. The boost pump inducer 18 draws fuel from the fuel tank 16 and delivers the fuel to a fuel filter 20 and heat exchanger 22, which removes heat from the fuel.

A first non-positive displacement pump, such as a centrifugal pump 24, is driven by a shaft 25. Fuel from the centrifugal pump 24 is provided to a positive displacement pump 26 and a motive flow valve 28, which pressurizes the fuel within the fuel tank 16.

The positive displacement pump 26 is driven by an electric motor 30, which is independently operable relative to the gearbox 14 and turbine engine 12. In one example, the electric motor 30 is three horsepower and weighs approximately fifteen pounds. The positive displacement pump 26 provides a constant volume of liquid for a given speed regardless of the pressure to which the positive displacement pump 26 is exposed. The positive displacement pump 26 meters the amount of fuel delivered to the turbine engine 12 and provides a desired fuel volume. The volume of fuel through the positive displacement pump 26 is varied by varying the speed of the electric motor 30 eliminating the need for fuel metering valve.

A second non-positive displacement pump, such as a centrifugal pump 32, is driven by a shaft 33. The centrifugal pumps 24 and 32 provide the pressure needed to deliver fuel through the turbine engine 12 in a desired manner. In one example, the pressure of the fuel at the inlet to the centrifugal pump 32 is between 60–110 psi. The centrifugal pump 32 raises the pressure of the fuel to approximately 1100–1200 psi at the outlet of the centrifugal pump 32.

Fuel from the second centrifugal pump 32 flows through a minimum pressure shut-off valve 34, which closes at 40 psi in one example. A shut-off solenoid 36a is operable to stop the flow of fuel to the turbine engine 12 during shut down procedures initiated by the pilot, for example. Another shut-off solenoid 36b stops the flow of fuel to the engine turbine 12 during over speed conditions, for example. The valves 34, 36*a* and 36*b* are known in the art. The fuel is delivered to the turbine engine 12 through a flow divider 38 that sends the fuel through primary and secondary nozzles 40*a* and 40*b*, as is well known in the art.

An alternator 42 is driven by the gearbox 14 along with the boost pump inducer 18 and centrifugal pumps 24 and 32 through a shaft 43. The inventive arrangement of centrifugal pumps 24 and 32 enables the centrifugal pumps 24 and 32 and alternator 42 to be driven at the same rotational speed. In the prior art, a separate gear pad was provided on the gearbox 14 to drive the positive displacement pump at a different speed than the alternator. The alternator 42 generates power that may be used to drive the electric motor 30. A switching device or relay 48 selectively provides the power from the alternator 42 to the electric motor 30 in response to a speed command 46 from a controller 44 to vary the speed of the electric motor 30 based upon a desired volume of fuel. The fuel speed of the electric motor 30 can be controlled much more accurately than control of the prior art fuel metering valves.

The positive displacement pump is sized to provide a sufficient volume of fuel for a turbine engine start-up condition. That is, the flow rate curve of the positive displacement pump 26 is selected to match the needed volume of fuel for the turbine engine 12 during start-up. The centrifugal pump 32 is selected so that the head curve of the centrifugal pump 32 matches the backpressure curve of the turbine engine. In this manner, excess pressure will not be generated by the centrifugal pump 32 eliminating the need for a high pressure relief valve and minimizing any potential issues related to burst or over pressure conditions.

In operation, the controller 44 determines a desired fuel flow for the turbine engine 12 and requests a desired fuel flow by providing a speed command to the electric motor 30. The electric motor 30 drives the positive displacement pump at a speed selected to provide a fuel volume adequate to satisfy the desired fuel flow of the turbine engine 12. The centrifugal pumps 24 and 32 are driven by the turbine engine 12, in the example shown. The centrifugal pump 32 produces a desired fuel pressure for delivering the fuel volume from the positive displacement pump 26 at desired pressure for the engine backpressure curve of the turbine engine 12.

Figure 2:
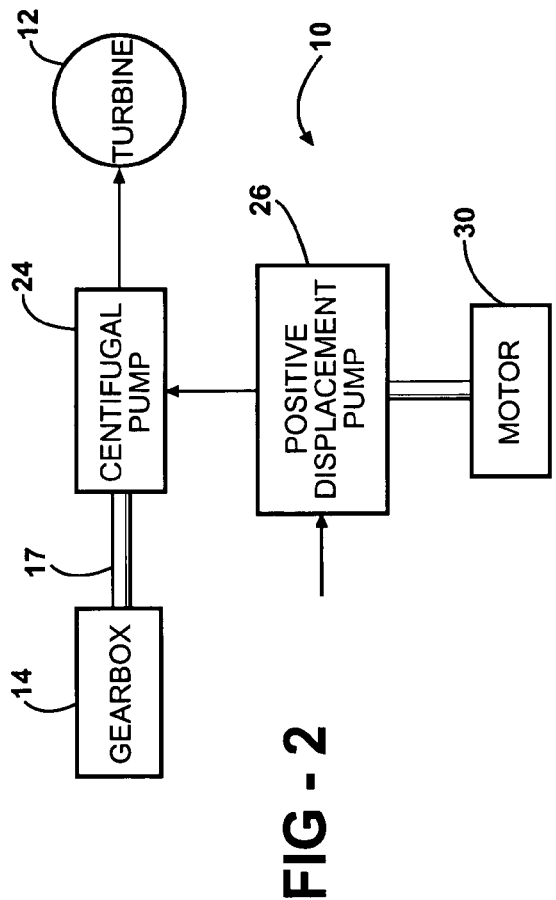
FIG. 2 is a schematic view showing another arrangement of the pumps.
Figure 3:
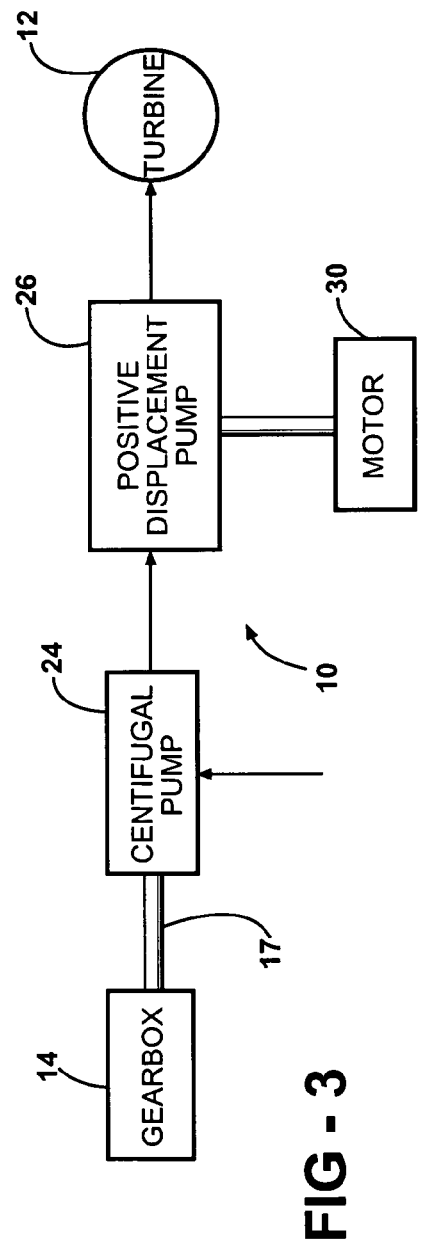
FIG. 3 is a schematic view showing yet another arrangement of the pumps.

FIG. 1 schematically depicts the positive displacement pump arranged in series between the centrifugal pumps 24 and 32. Other suitable pump arrangements may be used. In one example shown in FIG. 2, the one centrifugal pump is eliminated such that the positive displacement pump 26 is fluidly connected downstream of the centrifugal pump 24 in series. In another example shown in FIG. 3, the centrifugal pump 24 is arranged downstream of the positive displacement pump 26.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel system comprising:

first and second drive assemblies independently drivable relative to one another, the second drive assembly having a speed selectively controlled based upon a desired fuel flow;

a non-positive displacement pump driven by the first drive assembly, the non-positive displacement pump providing a desired fuel pressure; and a positive displacement pump driven by the second drive assembly, the positive displacement pump in fluid communication with the non-positive displacement pump, the positive displacement pump metering a desired volume in response to the speed, wherein the pumps are fluidly connected in series with one another, wherein the non-positive displacement pump is fluidly connected upstream of the positive displacement pump wherein the positive displacement pump is fluidly connected between the non-positive displacement pump and a second non-positive displacement pump.

2. The fuel system according to claim 1, wherein the non-positive displacement pump is a centrifugal pump.

3. The fuel system according to claim 2, wherein the first drive assembly includes a turbine engine.

4. A fuel system comprising:

first and second drive assemblies independently drivable relative to one another, the second drive assembly having a speed selectively controlled based upon a desired fuel flow, wherein the first drive assembly includes a turbine engine;

a non-positive displacement pump driven by the first drive assembly, the non-positive displacement pump providing a desired fuel pressure; and a positive displacement pump driven by the second drive assembly, the positive displacement pump in fluid communication with the non-positive displacement pump, the positive displacement pump metering a desired volume in response to the speed, wherein the non-positive displacement pump is a centrifugal pump; and an alternator driven by the turbine engine at a second speed, the centrifugal pump driven by the turbine engine at the second speed with the alternator.

5. The fuel system according to claim 1, wherein the positive displacement pump is fluidly connected upstream of the second non-positive displacement pump.

6. The fuel system according to claim 1, wherein the second drive assembly includes an electric motor.

7. The fuel system according to claim 6, comprising a controller and a turbine engine, wherein the pumps provide fuel to the turbine engine, and the controller determines a fuel demand for the turbine engine and provides a speed command to the electric motor corresponding to the desired fuel flow for satisfying the fuel demand.

8. A method of delivering fuel to a fuel system component comprising the steps of:

a) requesting a desired fuel flow;

b) driving a first pump at a speed to provide a fuel volume in response to step a);

c) driving a second pump independently of the first pump, the second pump producing a desired fuel pressure for the fuel volume; and d) driving a third pump, the first pump fluidly connected between the second and third pumps.

9. The method according to claim 8, wherein step b) includes driving the first pump with an electric motor during a turbine engine start-up.

10. The method according to claim 9, wherein the first pump is a positive displacement pump having a characteristic flow rate curve, the method comprising the step of selecting the positive displacement pump based upon a flow rate requirement during the turbine engine start-up.

11. The method according to claim 8, wherein the second pump is a centrifugal pump having a characteristic head curve, the pumps providing the desired fuel flow to a turbine engine, the turbine engine having an engine backpressure curve, the method comprising the step of selecting the centrifugal pump to match the characteristic head curve with the engine backpressure curve.

12. The method according to claim 8, wherein the pumps are fluidly connected in series with one another, the first pump is a positive displacement pump and the second pump is a centrifugal pump.

* * * * *